(12) United States Patent
Gorokhov et al.

(10) Patent No.: US 9,264,183 B2
(45) Date of Patent: Feb. 16, 2016

(54) ACKNOWLEDGMENT CHANNEL FOR WIRELESS COMMUNICATIONS

(75) Inventors: Alexei Gorokhov, San Diego, CA (US); Aamod Khandekar, San Diego, CA (US); Naga Bhushan, San Diego, CA (US); Petru Christian Budianu, San Diego, CA (US); Ravi Palanki, San Diego, CA (US); Siddhartha Mallik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 710 days.

(21) Appl. No.: 12/446,709

(22) PCT Filed: Oct. 24, 2007

(86) PCT No.: PCT/US2007/082325
§ 371 (c)(1),
(2), (4) Date: Apr. 22, 2009

(87) PCT Pub. No.: WO2008/052024
PCT Pub. Date: May 2, 2008

(65) Prior Publication Data
US 2010/0002640 A1 Jan. 7, 2010

Related U.S. Application Data

(60) Provisional application No. 60/862,649, filed on Oct. 24, 2006.

(51) Int. Cl.
*H04W 4/00* (2009.01)
*H04L 1/16* (2006.01)
(Continued)

(52) U.S. Cl.
CPC ............ *H04L 1/1671* (2013.01); *H04L 1/1858* (2013.01); *H04W 76/02* (2013.01)

(58) Field of Classification Search
CPC .................................................... H04W 72/04

USPC ......................................................... 370/329
See application file for complete search history.

(56) References Cited

U.S. PATENT DOCUMENTS 6,718,179 B1* 4/2004 Forssell et al. ................ 455/509
7,693,125 B2* 4/2010 Ihm et al. ...................... 370/343
(Continued)

FOREIGN PATENT DOCUMENTS

JP   2005253021 A   9/2005
JP   2005529546 A   9/2005
(Continued)

OTHER PUBLICATIONS

International Search Report—PCT/US2007/082325, International Search Authority—European Patent Office—Apr. 11, 2008.
(Continued)

*Primary Examiner* — Maharishi Khirodhar
(74) *Attorney, Agent, or Firm* — Ashish L. Patel

(57) ABSTRACT

Systems and methodologies are described that facilitate establishing a forward link acknowledgement channel and transmitting acknowledgment signals thereupon. In particular, the signals can be spread within contiguous channel clusters in a tile where the signals in the cluster are mutually orthogonal to one another. Additionally, the signals can be multiplexed over a plurality of frequency regions. In this regard, the acknowledgment signals are diverse with respect to frequency and interference; moreover, the signals can be received and decoded even where one of the channels experiences high interference. Furthermore, the acknowledgement signals can also communicate a channel deassignment value, which allows devices to utilize persistent channels in communicating data to one another.

25 Claims, 12 Drawing Sheets

(51) Int. Cl.
*H04L 1/18* (2006.01)
*H04W 76/02* (2009.01)

(56) References Cited

U.S. PATENT DOCUMENTS

| | | | |
|---|---|---|---|
| 7,792,074 | B2 | 9/2010 | Chen et al. |
| 7,852,746 | B2 | 12/2010 | Jalali |
| 2005/0030964 | A1* | 2/2005 | Tiedemann et al. ......... 370/431 |
| 2005/0165949 | A1* | 7/2005 | Teague ......................... 709/236 |
| 2006/0133522 | A1* | 6/2006 | Sutivong et al. ............. 375/260 |
| 2006/0171295 | A1 | 8/2006 | Ihm et al. |
| 2007/0097853 | A1* | 5/2007 | Khandekar et al. ......... 370/208 |
| 2007/0211658 | A1* | 9/2007 | Gorokhov et al. ........... 370/329 |

FOREIGN PATENT DOCUMENTS

| | | |
|---|---|---|
| JP | 2007528662 A | 10/2007 |
| JP | 2007531386 A | 11/2007 |
| JP | 2008526090 A | 7/2008 |
| JP | 2008526091 A | 7/2008 |
| JP | 2008537379 | 9/2008 |
| JP | 2010507998 A | 3/2010 |
| JP | 2013085270 A | 5/2013 |
| RU | 2282310 C2 | 8/2006 |
| TW | 564618 B | 12/2003 |
| WO | WO 9848581 A1 * | 10/1998 |
| WO | WO-02080609 A1 | 10/2002 |
| WO | WO-2005074178 A1 | 8/2005 |
| WO | WO 2005074184 | 8/2005 |
| WO | WO-2005088886 A1 | 9/2005 |
| WO | WO-2005117385 A1 | 12/2005 |
| WO | WO-2006026344 | 3/2006 |
| WO | 2006069299 | 6/2006 |
| WO | WO-2006071049 A1 | 7/2006 |
| WO | WO-2006071050 A1 | 7/2006 |
| WO | WO-2006083077 A1 | 8/2006 |
| WO | 2007103990 | 9/2007 |

OTHER PUBLICATIONS

Translation of Office Action in Russian application 2009119508 corresponding to U.S. Appl. No. 12/446,709, citing RU2282310, WO06069299 and US20050165949 dated Feb. 7, 2011.
Written Opinion—PCT/US07/082325, International Searching Authority—European Patent Office, Apr. 11, 2008.
Taiwan Search Report—TW096139897—TIPO—Feb. 25, 2012.
European Search Report—EP11007681—Search Authority—Berlin—May 28, 2013.
Taiwan Search Report—TW101122691—TIPO—Aug. 25, 2014.
Maeda N, "Performance of MMSE Combining Scheme for Forward Link Broadband OFCDM Packet Wireless Access using Multi-level Modulation", Proceedings of the 2002 IEICE General Conference, Mar. 7, 2002.
International Preliminary Report on Patentability—PCT/US07/082325, The International Bureau of WIPO—Geneva, Switzerland, May 7, 2009.

* cited by examiner

ACKNOWLEDGMENT CHANNEL FOR WIRELESS COMMUNICATIONS

CROSS-REFERENCE TO RELATED APPLICATIONS

This application claims the benefit of U.S. Provisional Patent application Ser. No. 60/862,649 entitled "ACKNOWLEDGEMENT CHANNEL FOR A WIRELESS COMMUNICATION SYSTEM" which was filed Oct. 24, 2006. The entirety of the aforementioned application is herein incorporated by reference.

BACKGROUND

I. Field

The following description relates generally to wireless communications, and more particularly to forward link acknowledgement channels in a wireless communications system.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

In such systems, acknowledgement packets can be sent from a base station to a mobile device to indicate that a portion of data was properly received. Acknowledgements can take place for substantially all communications sent from the mobile device to the base station (e.g., on the reverse link). Also, a channel can be established for each communication between the mobile device and base station or can be persistent to some extent as not to require establishment for each communication.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection facilitating communicating acknowledgements over a channel for a received data block; the acknowledgement can be spread among a plurality of acknowledgements in a contiguous mutually orthogonal channel cluster. Additionally, the acknowledgement can be multiplexed over a plurality of frequency regions and can comprise a channel deassignment value to provide persistent channel operability.

According to related aspects, a method that facilitates establishing a forward link acknowledgement channel is described herein. The method can include determining a status of a demodulation of a communication from an established reverse link and determining a channel deassignment value related to the established reverse link. The method can also comprise modulating an acknowledgement symbol chosen based in part on the status and the channel deassignment value.

According to a further aspect, a method that facilitates interpreting forward link acknowledgement signals is also described herein. The method can comprise transmitting a reverse link communication and receiving a contiguous cluster of a plurality of acknowledgement signals, at least one of the acknowledgement signals indicates a demodulation status for the reverse link communication. Moreover, the method can include determining the acknowledgement signal that indicates the demodulation status for the reverse link communication.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
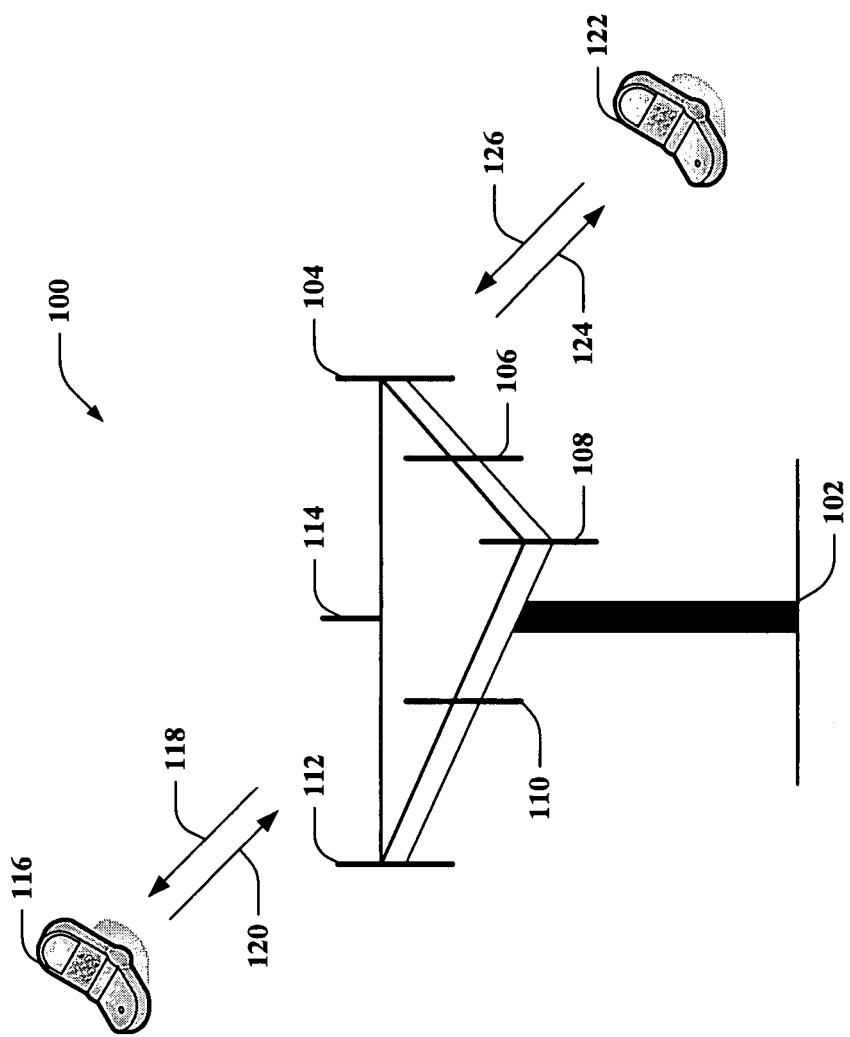
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. In one example, communications from the mobile devices 116 and 122 can be received and demodulated at the base station 102. To ensure effective demodulation, the base station 102 can transmit an acknowledgement (ACK) signal back to the mobile devices 116 and 122 over one or more of the antennas 104, 106, 108, 110, 112, and 114 indicating successful demodulation. In one example, the data sent from the mobile devices 116 and 122 can come in multiple communications such that successful demodulation may not occur until substantially all data, of a data packet for example, is received by the base station 102. According to an example, communications channels can be assigned to the mobile devices 116 and 122 from the base station 102 such that the channel can last beyond a single transmission. In this regard, a channel deassignment can be required to indicate that a mobile device or user thereof is no longer entitled to the channel. To minimize overhead of this functionality, in one example, this information can be comprised within the ACK signal as well.

The mobile devices 116 and 122 can receive the ACK signal, which can indicate a four-state acknowledgement channel including the possible combinations of acknowledged or not acknowledged, and deassigned or not deassigned. According to one example, this can be implemented as three phase shift keying (PSK) states, plus an off state (e.g., 4 total states), such that a change in signal modulation can indicate one of the combinations mentioned above. In this way, the base station can acknowledge the communications and deassign a channel in one packet. It is to be appreciated that this packet, however, can be modulated across multiple frequency regions to be robust with respect to frequency selective fading. In one example, modulating over multiple frequency regions, as described infra, can facilitate coherent demodulation upon receiving the data packet; this can be effectuated, for example, via utilizing a pilot channel as a reference for the demodulation (the pilot channel can be common across multiple forward links channels in a control segment in one example). Additionally, in one example, multiple acknowledgements can be orthogonalized within a given tile (time/frequency block) to resist interference issues with respect to neighboring ACK signals.

Figure 2:
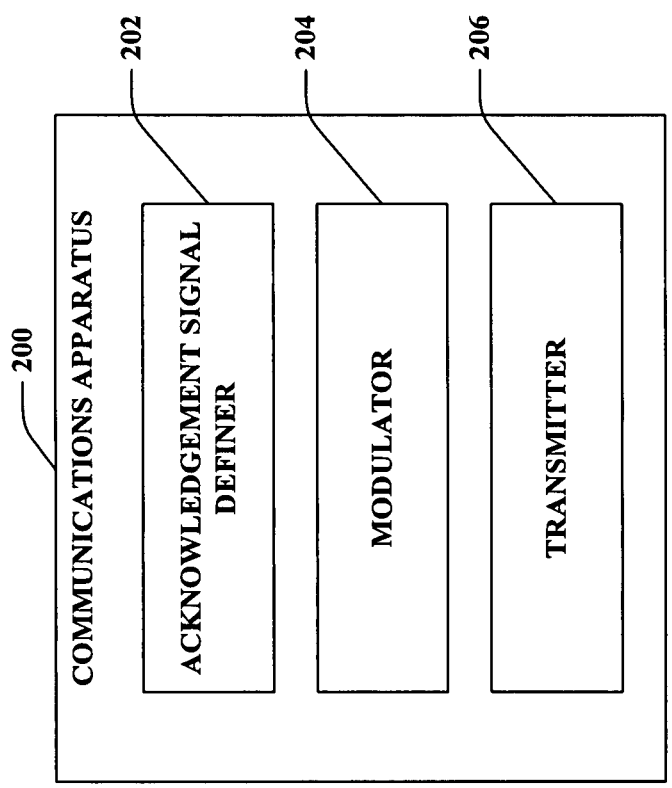
FIG. 2 is an illustration of an example communications apparatus for employment within a wireless communications environment.

Turning to FIG. 2, a communications apparatus 200 for a wireless communications environment is illustrated. Communications apparatus 200 can be a base station, mobile device or a portion thereof, for example. Communications apparatus 200 can comprise an acknowledgement signal definer 202 that can create a signal indicating acknowledgement or non-acknowledgement and deassignment or non-deassignment, a modulator 204 that can modulate the signal over a plurality of tiles (e.g., time/frequency blocks), and a transmitter 206 that transmits the modulated tiles. In one example, the communications apparatus can receive a transmission from another communications apparatus (e.g., mobile device, base station, etc.) over a channel and attempt to demodulate the transmission. If the demodulation is successful, the acknowledgement signal definer 202 can create an acknowledgement packet, modulate it over a plurality of tiles using the modulator 204, and transmit the packet back to the other communications apparatus.

According to an example, the communications apparatus 200 can operate in a persistent channel assignment configuration where communications channels (e.g., reverse link channels) are assigned not necessarily just for one transmission. In this regard, the channel can stay open for a period of time or a number of transmissions, for example, such that deassignment request and notification is desired to coordinate releasing the channel. To mitigate overhead in channel deassigning, this information can be accompanied with the acknowledgement signal that can be transmitted for substantially every communication packet. Thus, the acknowledgement signal definer 202 can create a 4-state acknowledgement signal corresponding to the following possible values in one example.

| Value | Acknowledgement | Deassignment |
|---|---|---|
| 0 | NO | NO |
| 1 | NO | YES |
| 2 | YES | NO |
| 3 | YES | YES |

It is to be appreciated that the above table is merely one configuration; the values can match to the possible values for acknowledgement and deassignment in substantially any possible combination. Additionally, more fields can be added along with more values that indicate different values for the fields; moreover, more values for the fields can be added as well (e.g., enumerations beyond binary values). According to the example, the acknowledgement signal definer 202 can create a signal to indicate the acknowledgement and deassignment values to save overhead for deassigning communications channels. In one example, the values above can correspond to PSK states, such that on a circle of a complex plane, the values 1-3 can correspond to 3 points spaced substantially equally and as far as possible away from each other on the circle (e.g. spaced 120 degrees apart), and value 0 can correspond to a point at the center of the circle.

The modulator 204, in one example, can spread the desired value over a plurality of different frequency regions or symbols, such as by using a discrete Fourier transform (DFT) for example, for diversity and to be robust with respect to frequency selective fading. It is to be appreciated, however, that in another example the value can be sent in a single modulation symbol of a single tile. Additionally, the communications apparatus 200 can mutually orthogonally cluster the symbol along with symbols for a number of other communications channels, such that the transmitter 206 can multiplex the symbols on top of each other during transmission. According to an example, the symbols for each communication channel are weighted where the weight can be chosen such that the values are mutually orthogonal (e.g., with the DFT code mentioned previously). In this regard, the multiplexing can cause an averaging for the symbols on the channels such that if there is interference from a transmission of another communications apparatus on the channel, the values can be averaged to determine the orthogonal symbols.

Figure 3:
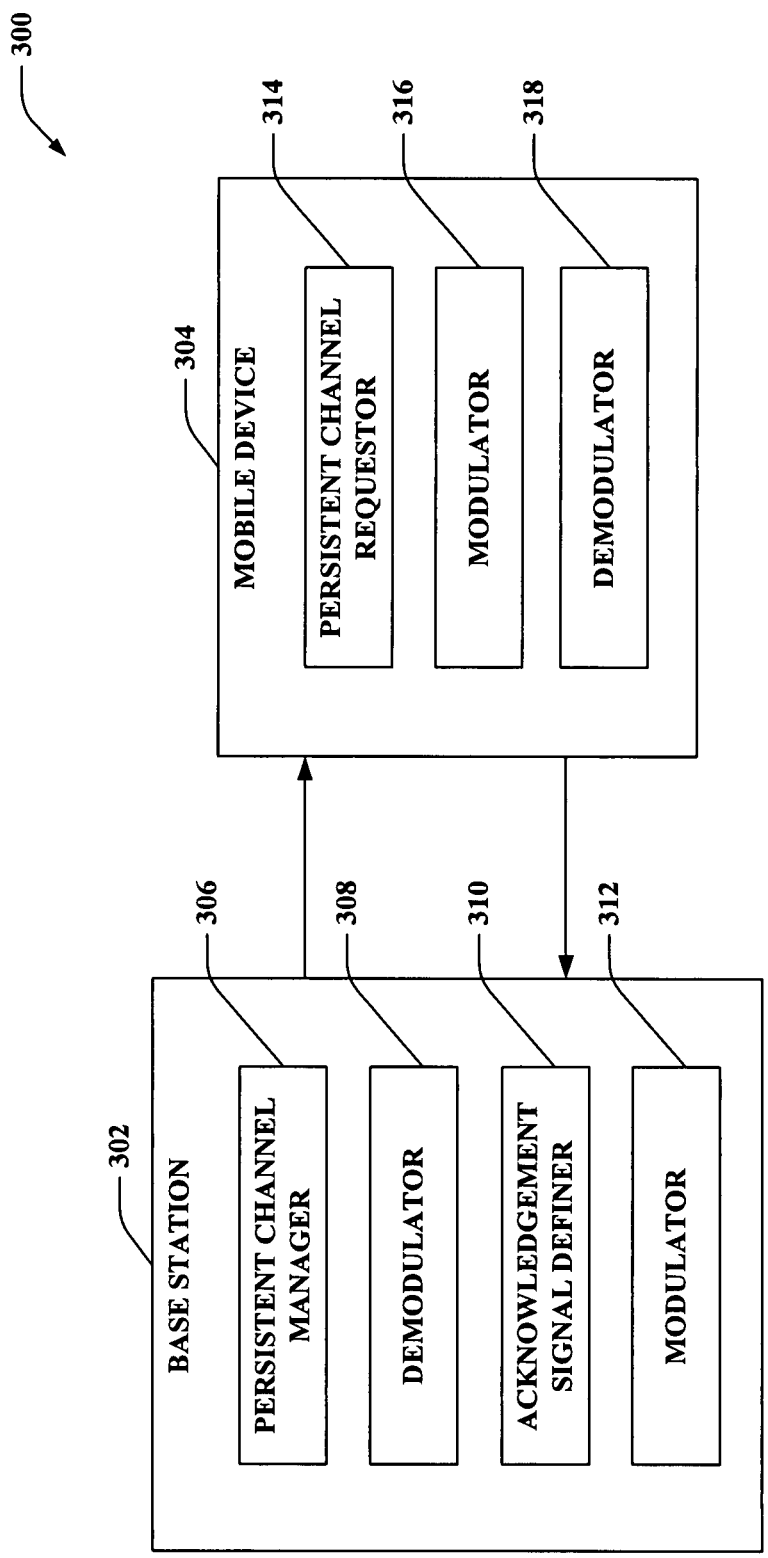
FIG. 3 is an illustration of an example wireless communications system that effectuates establishing a forward link acknowledgement channel.

Now referring to FIG. 3, a wireless communications system 300 that effectuates communicating reverse link acknowledgements is illustrated. The wireless communications system 300 includes a base station 302 that communicates with a mobile device 304 (and/or any number of disparate mobile devices (not shown)). The base station 302 can transmit information to the mobile device 304 over a forward link channel, for example; further, the base station 302 can receive information from the mobile device 304 over a reverse link channel and send a forward link acknowledgement to acknowledge the reverse link information. Moreover, the wireless communications system 300 can be a MIMO system in one example.

The base station 302 can include a persistent channel manager 306 to assign and communicate information regarding persistent reverse link communications channels, a demodulator 308 to demodulate signals from a mobile device 304, an acknowledgement signal definer 310 to create a signal to send to the mobile device 304 indicating a successful or failing demodulation of the reverse link traffic, and a modulator 312 to modulate the acknowledgement signal to send to the mobile device 304. The mobile device 304 can comprise a persistent channel requester 314 that can request establishment of a persistent reverse link communication channel from a base station 302, a modulator 316 to modulate data to send across the communication channel, and a demodulator 318 to demodulate signals received from the base station 302.

In one example, the mobile device 304 can utilize the persistent channel requester 314 to request a persistent reverse link channel from the base station 302; it is to be appreciated that this can be accompanied with substantive data, such as an identifier of the mobile device 304 (e.g., MAC ID), data related to a received beacon signal, and/or the like in one example. Additionally, the request can be modulated using the modulator 316. The persistent channel manager 306 can grant access for the channel and manage the lifetime and other aspects of the channel. Once the channel is established (or during establishment as well in one example) the mobile device 304 can modulate data using the modulator 316 and send it to the base station 302 over the persistent reverse link channel. Upon receiving the data, the base station 302 can utilize the demodulator 308 to attempt to demodulate the data. If the data is successfully demodulated, the acknowledgement signal definer 310 can send an acknowledgement notification, as described, to the mobile device 304. In one example, the acknowledgement notification can be one that includes a deassignment decision as well; moreover, the acknowledgement notification can be modulated using the modulator 312 to a number of different frequency regions for diversity and selective fading. Additionally, the acknowledgement notification can be multiplexed along with other acknowledgement notifications, as described, to provide mutually orthogonal modulation symbols for interference purposes (e.g., the symbols can give an average such that if there is interference, the average can be used to discern the symbols). Moreover, it is to be appreciated that the acknowledgement notification can be scrambled according to an identifier of the mobile device 304 and/or base station 302.

The acknowledgement signals can be sent by the base station 302 for the communications from the mobile device 304 to indicate a successful or unsuccessful demodulation or decoding. It is to be appreciated that an unsuccessful demodulation or decoding can occur when the entire communication is not yet sent in one example; additionally, other reasons can contribute to a faulty demodulation or decoding including bad signal quality, malformed communication, interfering communications, incompatibility, faulty encoding or modulating, and the like. In one example, hybrid automatic repeat request (H-ARQ) transmission can be used to transmit one or more transmissions for a data packet until the packet is decoded correctly or a maximum number of transmissions has been reached. Thus, as described, the base station 302 can send no_acknowledgement (NAK) notifications until the packet is received and decoded in full (or until the maximum number of transmissions has been reached). Moreover, as mentioned, the persistent channel manager 306 can desire to deassign the mobile device 304 from a persistent communication channel. In this regard, the acknowledgement signal definer can include this in the acknowledgement packet depending on the value chosen (e.g., the 4-state acknowledgement channel described previously).

According to an example, upon determining an acknowledgement state to send (e.g., acknowledgement/deassignment, acknowledgement/no_deassignment, no_acknowledgement/deassignment, no_acknowledgement/no_deassignment) by the acknowledgement signal definer 310, the modulator 312 can modulate symbols that indicate the acknowledgement state across a number of frequency regions to provide diversity with respect to channels and interference, as well as robustness with respect to frequency selective fading; the frequency regions can be chosen based at least in part on one or more time-frequency resources associated with reverse link traffic resources that can correspond to the acknowledgement channel, for example. According to another example, the frequency regions can be selected based at least in part on an identifier of the mobile device 304 (e.g., MAC ID), such as that transmitted in the channel establishment request. In one example, the symbols are repeated across 3 frequency regions. Furthermore, the acknowledgement state symbols to be sent to the mobile device 304 can be mutually orthogonally spread among contiguous clusters along with multiple symbols for other devices, which can provide interference and channel diversity, resistance to interference spikes on the individual modulation symbols, and near-far effect resistance. In one example, the cluster can be a box of 4 contiguous channels; however, it is to be appreciated that substantially any number of channels can be clustered such that each channel is adjacent to at least one other channel. In this regard, a detection algorithm can be used to detect the appropriate channel in the cluster, such as minimum mean squared error (MMSE) or other averaging algorithms.

Upon receiving the acknowledgement transmission(s), the mobile device 304 can detect the appropriate channel, as described (e.g., by MMSE or other algorithms) and demodulate using the demodulator 318. The resulting symbol(s) can indicate one of 4 states as described above (though additional states can be implemented). If acknowledgement is received along with no_deassignment, the mobile device 304 can continue sending other data, for example. If acknowledgement is received along with deassignment, the mobile device 304 can consider the base station 302 to have received the transmission successfully and the reverse link channel is closed, at which point the mobile device 304 can request a channel from another or the same base station 302 (or persistent channel manager 306). If no_acknowledgement is received along with no_deassignment, the mobile device 304 can continue sending the relevant data packet, or portion thereof, until a successful acknowledgement is received (or until a maximum transmission threshold for the packet is reached). If no_acknowledgement is received along with deassignment, the reverse link channel is deassigned and the mobile device 304 can request another channel from the same or other base station 302 (or persistent channel manager 306). It is to be appreciated that the channel deassignment can be the result of a previous request for deassignment made by the mobile device 304, the mobile device 304 moving out of range, higher priority devices taking over channels, etc.

Figure 4:
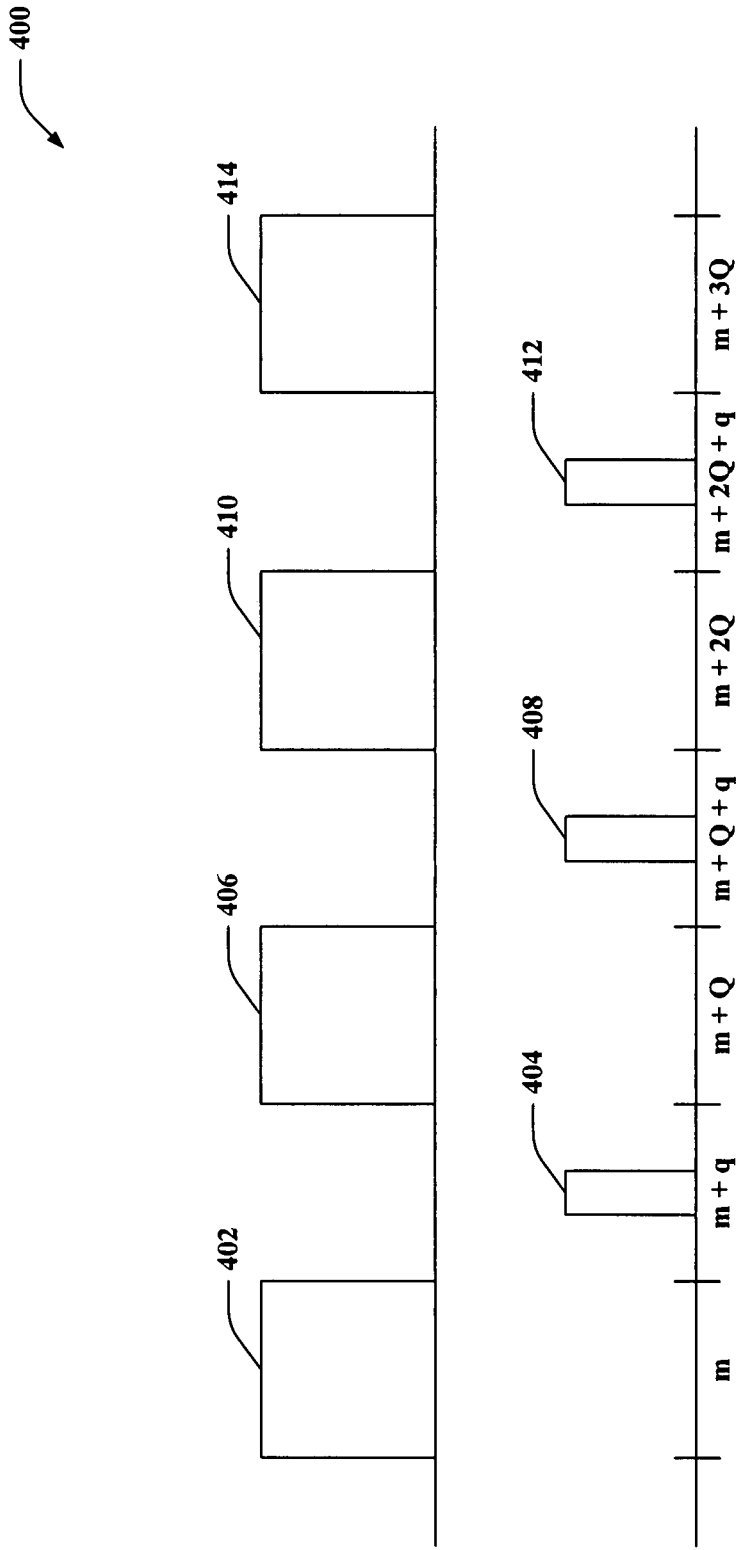
FIG. 4 is an illustration of example communication frames between a base station and mobile device.

Now referring to FIG. 4, an example communication frame set for a base station and mobile device 400 is shown. The frame set can be part of one or more superframes in one example. The frame set can comprise communications received by a base station from a mobile device 402, 406, 410, and 414, as well as corresponding response sent to the mobile device based on an acknowledgement notification and/or channel deassignment 404, 408, and 412. In one example, the transmissions 402, 406, 410, and 414 received from the mobile device can be H-ARQ transmissions where 402, 406, and 410 can be the 3 parts of a 3-part data packet transmission, and 414 is a part of another data packet. In this regard, the acknowledgement notifications 404 and 408 can indicate no_acknowledgement as the entire data packet has not been received. Then the acknowledgement notification 412 can indicate a successful acknowledgement as all parts of the message are received, demodulated, and decoded. Additionally, as described previously, an indication of channel deassignment can be sent with the acknowledgement notifications as well.

In this figure, the frame set is separated into one or more frames beginning at m and spaced apart by Q. At m, as described, block 1 of data packet 1 402 can be received. The base station can attempt to demodulate and decode producing an error as there are more blocks to be received. Accordingly, a NAK 404 can be sent to the terminal at m+q (where q is an ACK/NAK delay and 1≤q<Q). Upon receiving the NAK, the terminal can send, and the base station can receive, block 2 of data packet 1 406 at m+Q. Again, a demodulate and decode can be in error causing the base station to send a NAK 408 at m+Q+q. This can cause the device to send block 3 of data packet 1 410 at m+2Q to the base station. Upon receiving this block, in this example, the data packet can be completely and successfully decoded causing the base station to send an ACK 412 at m+2Q+q causing the device to terminate transmission of data packet 1. Assuming the base station does not also deassign the channel at this point, the device can begin sending a block of a new packet 414 at m+3Q. According to another example, the absence of an ACK can be interpreted as a NAK.

In this example, the data blocks are sent every Q frames; however, it is to be appreciated that up to Q packets can be transmitted in an interlaced manner to improve channel utilization. For example, a first interlace can be formed with frames m, m+Q, etc. and a second interlace with frames m+1, m+Q+1, etc. and the Q-th interlace is formed with frames m+Q−1, m+2Q−1, etc. Since the Q interlaces are offset by one frame, the mobile device can transmit up to Q packets on the Q interlaces. In general, the H-ARQ retransmission delay Q and the ACK/NAK delay q can be selected to provide sufficient processing time for the base station and mobile device in one example.

Figure 5:
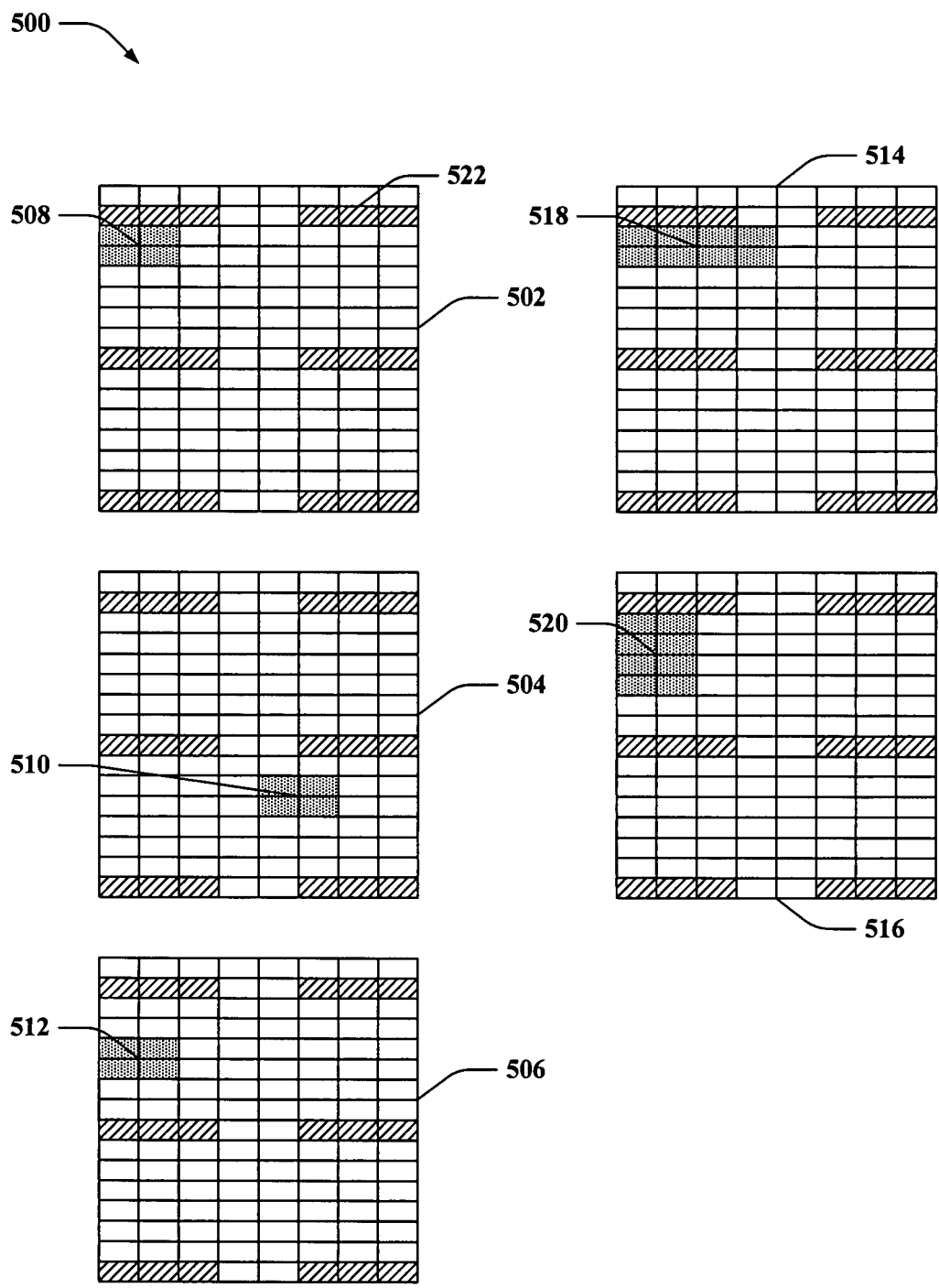
FIG. 5 is an illustration of example communication tiles for implementing contiguous acknowledgement clustering.

Now referring to FIG. 5, example sets of acknowledgement channel layouts 500 are displayed. Time/frequency blocks or tiles 502, 504, 506, 514, and 516 are shown comprising pilot symbols 522 and acknowledgment symbol cluster layouts 508, 510, 512, 518, and 520. Blocks 502, 504, and 506 represent a first configuration for acknowledgement symbol spreading and frequency assignment as described herein. In particular, the blocks 502, 504, and 506 show 4 mutually orthogonal contiguous clusters of acknowledgement symbols 508, 510, and 512 placed at 3 frequency regions. As described, the symbols can be spread across the clusters in a mutually orthogonal configuration such that they are contiguous; in this regard, each symbol is adjacent to at least one other symbol. Also, the modulation symbols can each relate to different devices having established a reverse link acknowledgement channel as described supra. Multiplexing the symbols adjacent to one another can allow for acknowledgement symbol identification even where interference is great on an individual modulation symbol (such as from another device, for example). In another configuration, represented by tiles 514 and 516, more than 4 contiguous acknowledgement symbols can be spread across the tile; symbol clusters 518 and 520 show configurations for 8 symbols. Additionally, the configuration can change for a given symbol as it is broadcast over the tiles as shown. It is to be appreciated that almost limitless configurations are possible such that the symbols are contiguous. Additionally, substantially limitless possibilities are available for transmitting the symbols across multiple frequency regions. It is to be appreciated that contiguously spreading the symbols, as described, can improve reliability of communication as orthogonality of multiplexed channels can be distorted by time and/or frequency channel variations; to this end, the spreading provides contiguity of time and/or frequency to reduce the effect of time and/or frequency selectivity on the channels. According to an example, the contiguous layout can be a factor of channel properties, expected channel properties, preconfiguration, inferences, and/or the like.

According to an example, the spreading can be implemented by generating an n×1 vector of acknowledgement symbols; the 3n×1 vector of transmitted modulation symbols x can be given by the equation x=Sa where x is the transmit vector, S is the spreading matrix, and a is the acknowledgement. In one example, S can be given by $$S = \begin{bmatrix} S_1 \\ S_2 \\ S_3 \end{bmatrix}.$$

Additionally, S can be defined as $S_i^H S_i = S_i S_i^H = I_n$. In this aspect, the n×1 vector of x modulation symbols transmitted in tile i can be given by $x_i = S_i a$. According to another example, the number of acknowledgements, a, can be less than the size of the spreading matrix, S, leaving one or more spreading symbols unused. In this regard, the unused spreading codes can allow for interference estimation within a cluster by utilizing the unused symbol to estimate a position for one or more of the cluster symbols. Thus, required detection thresholds for the symbols, and/or required signal-to-noise ratio (SNR), can be effectively reduced.

As described, the modulated tiles 502, 504, and 506, in one example, can resist interference burst for a single modulation symbol as the mutually orthogonal contiguous symbols can provide an average over the cluster. Accordingly, a device can utilize averaging algorithms to interpret the symbols (such as MMSE, as mentioned). Additionally, the symbols being sent over multiple frequency ranges, as shown, can provide benefits for frequency selective fading.

According to an example, the modulating sequences for the symbols over the multiple frequencies can be chosen based on one or more identifiers associated with a mobile device (such as a MAC ID). Thus, the sequences can be different for disparate devices. To this end, the disparate sequences can help prevent false acknowledgement errors that can occur due at least in part to an error in channel deassignment. For instance, where a channel is deassigned from one device and assigned to another but the first device misses the deassignment, the first device can still transmit reverse link data. Where the same modulation sequence is used, the base station can send an acknowledgement to the second device and the first device can improperly interpret the acknowledgement since it missed the channel deassignment. This is because acknowledgement is channel-based, as described herein, and not necessarily device based; thus, when channel assignment involves multiple base nodes of a channel tree, the acknowledgement is sent on one of the corresponding resources (e.g., that associated with the lowest base node within the assignment) regardless of the device assigned to the base node(s) or channel(s) at the time. However, using modulation sequences that correspond to a device identifier (or that are scrambled according to the identifier) can mitigate this behavior since the receiving device will know, or can verify, that the acknowledgement is its own by the sequence chosen by the base station.

Figure 6:
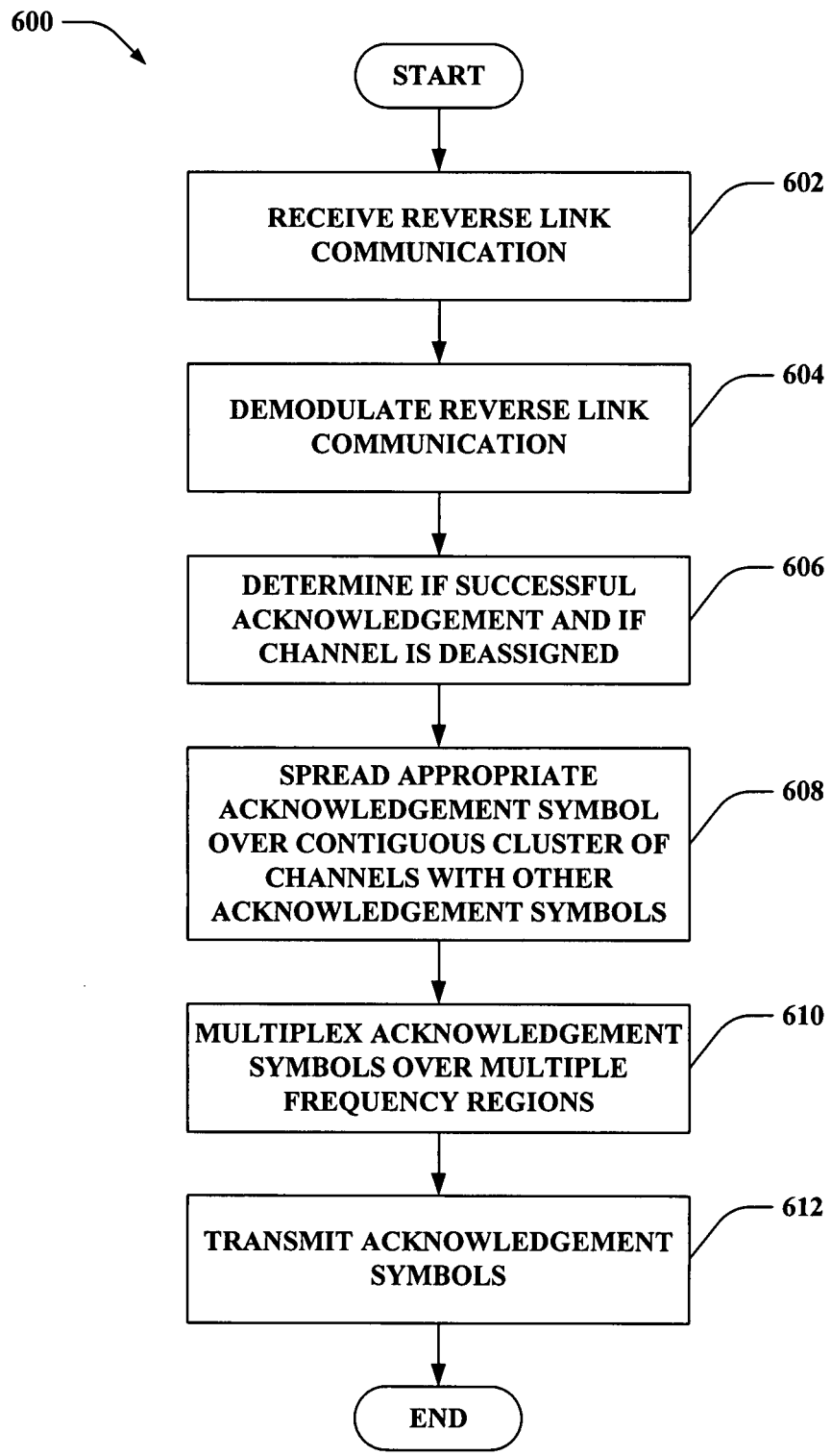
FIG. 6 is an illustration of an example methodology that facilitates communicating acknowledgement and channel deassignment indicators.
Figure 7:
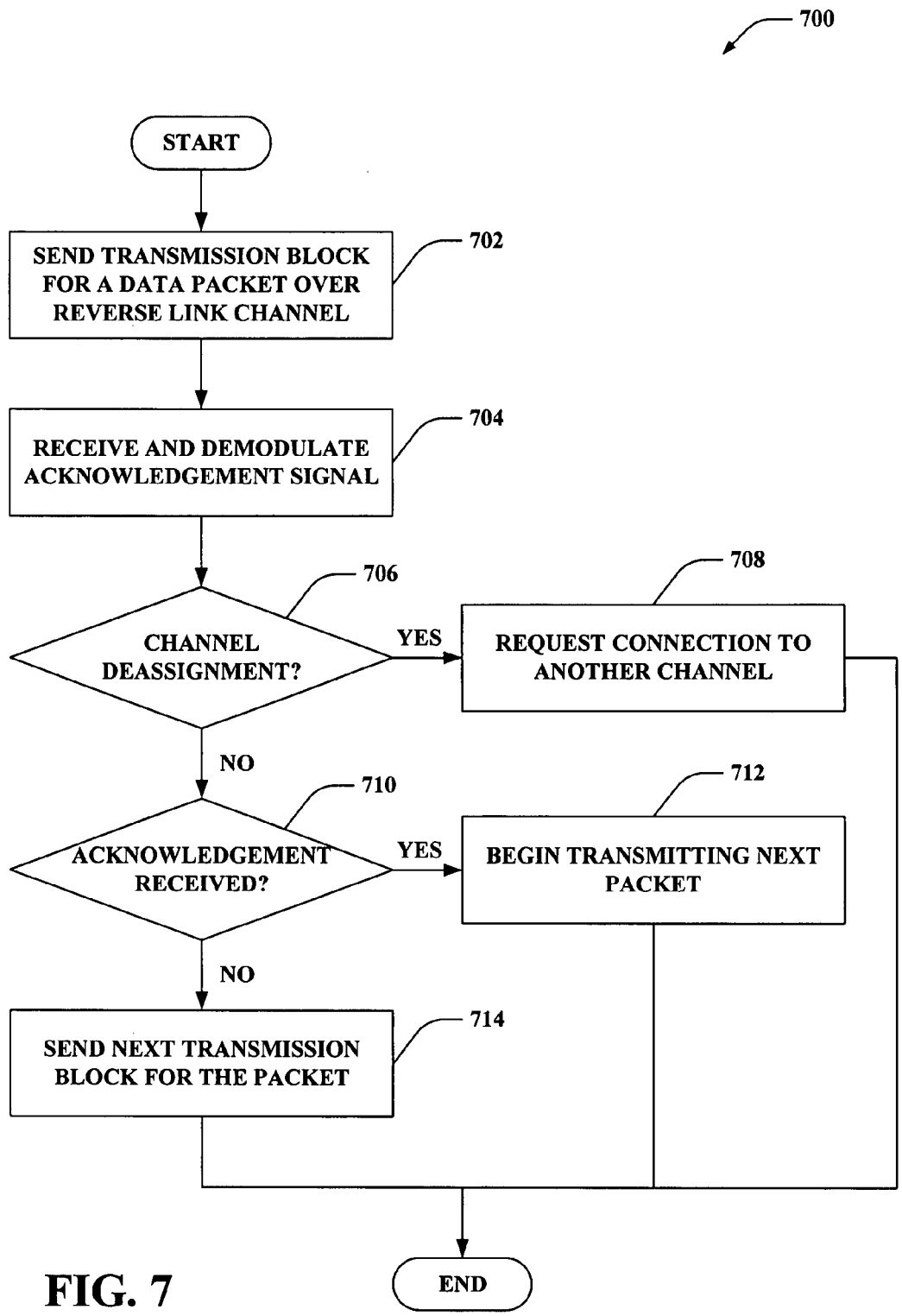
FIG. 7 is an illustration of an example methodology that facilitates receiving and interpreting acknowledgement and channel deassignment indicators.

Referring to FIGS. 6-7, methodologies relating to defining and providing a reverse link acknowledgment channel are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Now referring to FIG. 6, a methodology 600 that facilitates sending reversing link acknowledgments over a channel with a channel deassignment indicator is illustrated. At 602, communication is received over a reverse link. In one example, this can be a data packet or a portion thereof (sent in a data block, for example). The communication can be modulated as a number of symbols over time. At 604, the communication can be demodulated to obtain the data packet for decoding. If the communication comprises a partial data packet, the demodulation might not be successful, for example, in which case a no_acknowledgement symbol can be sent to the device. Alternatively, the data packet can be demodulated as it is and entire data packet or a completing portion for a portion already received. In this case, an acknowledgement symbol can be sent to the device. Moreover, a decision can be made as to whether or not to deassign the reverse link communication channel over which the communication came. Thus, at 506, an appropriate acknowledgement packet can be determined for transmitting to the device, which can comprise the indication of successful or unsuccessful demodulation and channel deassignment or no channel deassignment.

At 608, the acknowledgement symbol can be spread over a contiguous cluster comprising a plurality of other acknowledgement symbols; the symbols can be mutually orthogonal to one another such to provide identification of a given symbol (e.g. by using an MMSE or other averaging algorithm). In this regard, transmitting the symbols in the cluster can make the transmission withstand interference on a given symbol, provide channel or interference diversity, provide near-far effect resistance, and/or the like. Moreover, at 610, the symbols can be multiplexed over multiple frequency ranges providing addition diversity and robustness with respect to frequency selective fading. At 612, the symbols are transmitted over the multiple frequency ranges and in the respective mutually orthogonal contiguous cluster.

With reference to FIG. 7, a methodology 700 that facilitates receiving and processing an acknowledgement notification is displayed. At 702, a transmission block for a data packet is sent over a reverse link channel; this can be to a device such as an access point, for example. At 704, an acknowledgement signal is received relating to the data packet and demodulated to discern information comprised within the signal. As described herein, the acknowledgement signal can comprise an indication of acknowledgement or not and of channel deassignment or not. At 706, the value is checked for channel deassignment. As described, the reverse link channel can be persistent and a manager can be used to assign and manage a plurality of channels assigned to disparate devices, for example. Thus, an indication of channel deassignment can be desirable (and can come as a result of requesting such deassignment, moving out of range, etc. as previously described).

If the channel is deassigned, at 708 a request for connection to another channel (for the same or different access point) can be made to continue communication. If the channel is not deassigned, the value can be checked for an indication of acknowledgement at 710. If an acknowledgement is received, indicating successful demodulation of the communication on the reverse link, for example, at 712, a subsequent packet can begin to transmit. If, however, a negative acknowledgement is received (or none at all), then at 714 the next block for the packet can be transmitted (if it exists). If this is the last block, for example, the data packet can be re-sent in one example. In this regard, the acknowledgement can not only indicate successful or unsuccessful decoding of a transmission block, or collection of blocks, but can also indicate channel deassignment in the same symbol and do so with frequency and interference diversity as described.

It will be appreciated that, in accordance with one or more aspects described herein, inferences can be made regarding schemes for modulating the symbol among a plurality of such symbols in a mutually orthogonal cluster as well as multicasting the symbol over a plurality of frequency regions. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting channels and/or frequencies for transmitting the acknowledgement notifications. By way of further illustration, an inference can be made based in part on previous selection of frequencies and channels for transmitting acknowledgements, known areas of channel or frequency interference, and/or the like. It is to be appreciated that the foregoing examples are illustrative in nature and are not intended to limit the number of inferences that can be made or the manner in which such inferences are made in conjunction with the various embodiments and/or methods described herein.

Figure 8:
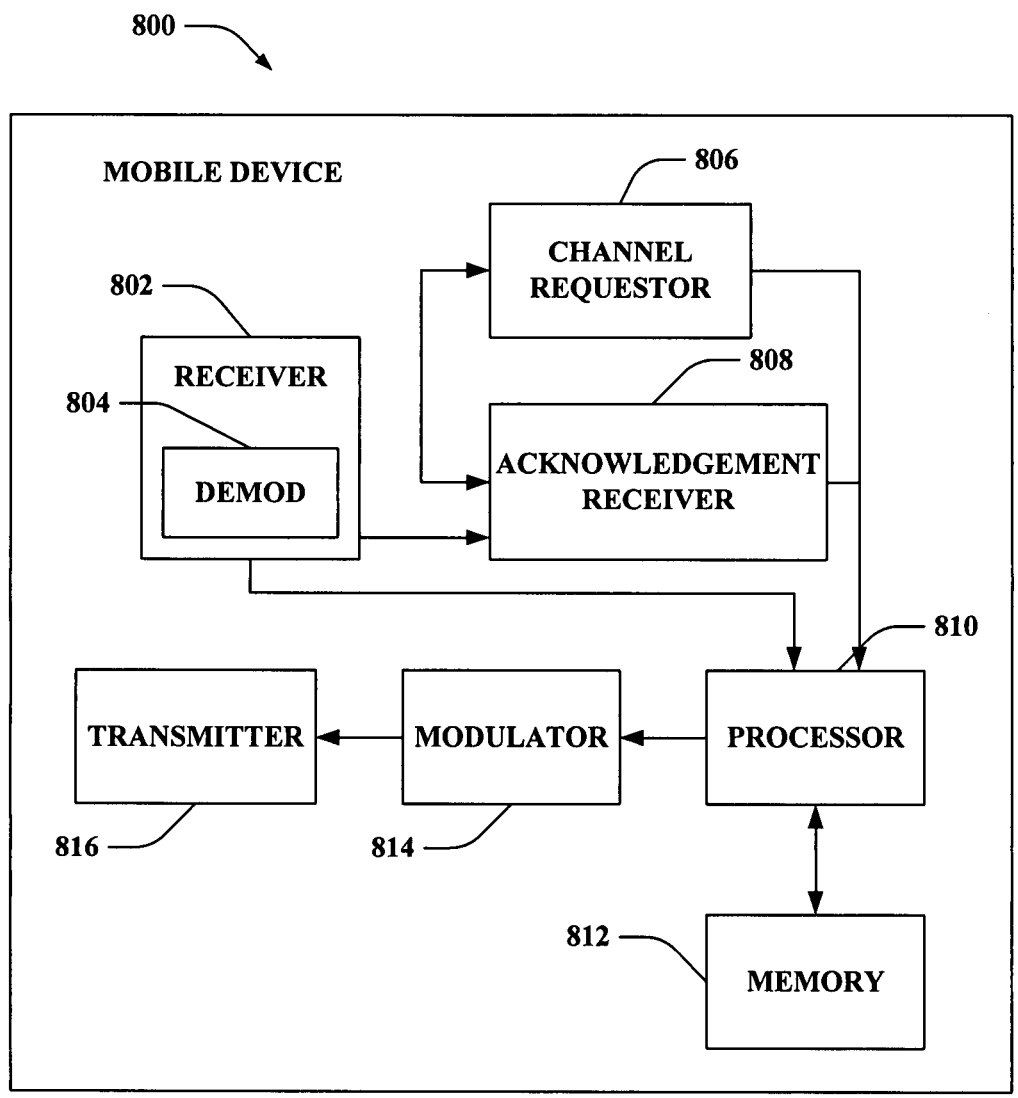
FIG. 8 is an illustration of an example mobile device that facilitates receiving acknowledgement signals over a persistent channel.

FIG. 8 is an illustration of a mobile device 800 that facilitates receiving and interpreting acknowledgement notifications in a MIMO system, for example. Mobile device 800 comprises a receiver 802 that receives a signal from, for instance, a receive antenna (not shown), and performs typical actions thereon (e.g., filters, amplifies, downconverts, etc.) and digitizes the conditioned signal to obtain samples. Receiver 802 can be, for example, an MMSE receiver, and can receive information regarding the mutually orthogonal cluster of symbols as described previously. Additionally, the mobile device 800 can comprise a demodulator 804 that can demodulate received information, such as acknowledgement notifications, and transfer such to an acknowledgement receiver 808 and/or a processor 810 for example. Also, a channel requestor 806 is provided to request establishment of reverse link communications channel from other devices, such as base stations and access points, for example. Processor 810 can be a processor dedicated to analyzing information received by receiver 802 and/or generating information for transmission by a transmitter 816, a processor that controls one or more components of mobile device 800, and/or a processor that analyzes information received by receiver 802, generates information for transmission by transmitter 816, and controls one or more components of mobile device 800.

Mobile device 800 can additionally comprise memory 812 that is operatively coupled to processor 810 and that can store data to be transmitted, received data, information related to available channels, data associated with analyzed signal and/or interference strength, information related to an assigned channel, power, rate, or the like, and any other suitable information for estimating a channel and communicating via the channel. Memory 812 can additionally store protocols and/or algorithms associated with estimating and/or utilizing a channel (e.g., performance based, capacity based, etc.). Moreover, the memory 812 can store information related to demodulation and interpretation of acknowledgement symbols and channel deassignments associated therewith, for example.

It will be appreciated that the data store (e.g., memory 812) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 812 of the subject systems and methods is intended to comprise, without being limited to, these and any other suitable types of memory.

According to an example, the channel requester 806 can formulate a request for a reverse link communication channel and transmit the request to one or more base stations or access points, by utilizing the transmitter 816 for example. Upon channel establishment, the mobile device 800 can transmit information over the reverse link channel (e.g. by utilizing the modulator 814 to modulate the information and transmitter 816 to send the information) and receive an acknowledgement indication via the receiver 802 (which can be demodulated by the demod 804). The acknowledgement indication can control subsequent action of the mobile device 800 in one example; the acknowledgement receiver 808 can receive the acknowledgement indication and interpret the data. The acknowledgement indication can comprise, as mentioned, a boolean indication of acknowledgement and a boolean indication of channel deassignment. It is to be appreciated that other values and/or number of possible values are virtually limitless; these are two examples of values used to facilitate discussion.

If the acknowledgement indication specifies channel deassignment, then the channel requester 806 can request a new channel from the same or different access point. It is to be appreciated that the processor 810 can leverage the channel requester 806 to perform this task by receiving the channel deassignment notification from the acknowledgement receiver 806, for example. Additionally, the acknowledgement receiver 808 can interpret the acknowledgement determination and send it to the processor 810 in one example; if the indication specifies acknowledgement, then the processor 810 can initiate modulation and transmission of a subsequent data packet. If the indication specifies no acknowledgement, then the next block of data for the data packet can be modulated by the modulator 814 and transmitted by the transmitter 816. If a subsequent block of data does not exist for the given packet, the packet can be re-sent, for example, or another error correction/reporting routine can execute.

Figure 9:
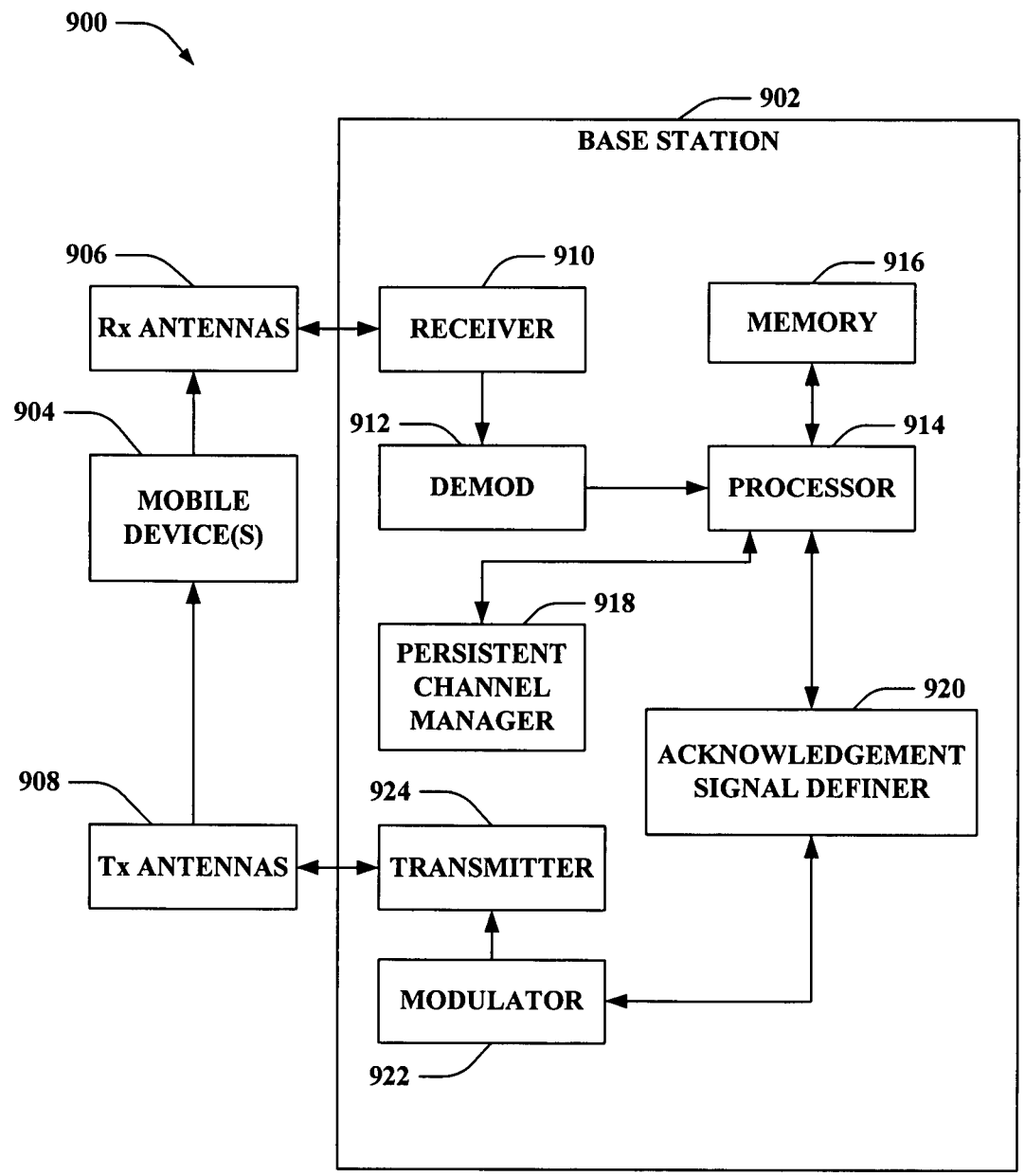
FIG. 9 is an illustration of an example system that facilitates transmitting acknowledgement signals over persistent channels.

FIG. 9 is an illustration of a system 900 that facilitates establishing and communicating over a forward link acknowledgement channel in a MIMO environment, for example. System 900 comprises a base station 902 (e.g., access point, . . . ) with a receiver 910 that receives signal(s) from one or more mobile devices 904 through a plurality of receive antennas 906, and a transmitter 924 that transmits to the one or more mobile devices 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 7, and which is coupled to a memory 916 that stores information related to estimating a signal (e.g., pilot) strength and/or interference strength, data to be transmitted to or received from mobile device(s) 904 (or a disparate base station (not shown)), and/or any other suitable information related to performing the various actions and functions set forth herein. Processor 914 is further coupled to a persistent channel manager 918 that can receive a request to establish a reverse link communication channel from one or more mobile device(s) 904. The processor 914 is also coupled to an acknowledgement signal definer 920 that can create an acknowledgement signal based at least in part on a success of the demodulator 912 and desired status for the reverse link channel.

According to an example, the persistent channel manager 918 can manage communications channels for one or more mobile device(s) 904. As described, the channels can be persistent such that they can have life longer than one data block or related data packet, for example. Once a channel is established, the mobile device(s) 904 can send data to the base station 902 via the receiver 910. The demodulator 912 can attempt to demodulate the data; if successful, the acknowledgement signal definer 920 can create an acknowledgement signal to indicate such. If unsuccessful, a similar signal can be created to indicate the failure. Additionally, the acknowledgement signal definer 920 can leverage the persistent channel manager 918 to determine if the persistent channel related to the mobile device(s) 904 should be deassigned. As mentioned, this can happen where such is requested from the mobile device(s) 904, the device(s) 904 are moving out of range or are losing signal power, other higher priority devices enter the service area, etc.

Once the acknowledgement and deassignment information are determined, a value can be selected for transmitting back to the mobile device(s) 904 to indicate the information. For example, the chosen value can relate to a 4-state acknowledgement PSK as described previously. Additionally, the value chosen can be modulated as one or more symbols (e.g. over a plurality of frequency regions), by the modulator 922, along with a plurality of other acknowledgement symbols for other channels such that the symbols are mutually orthogonally assigned in a contiguous cluster (such as a cluster of 4 as shown and described, for example). Assigning the symbols to contiguous channels and multiplexing them over a plurality of frequency regions can provide diversity for the symbol to protect against interference burst and provide increase robustness with respect to frequency selective fading as described supra.

Figure 10:
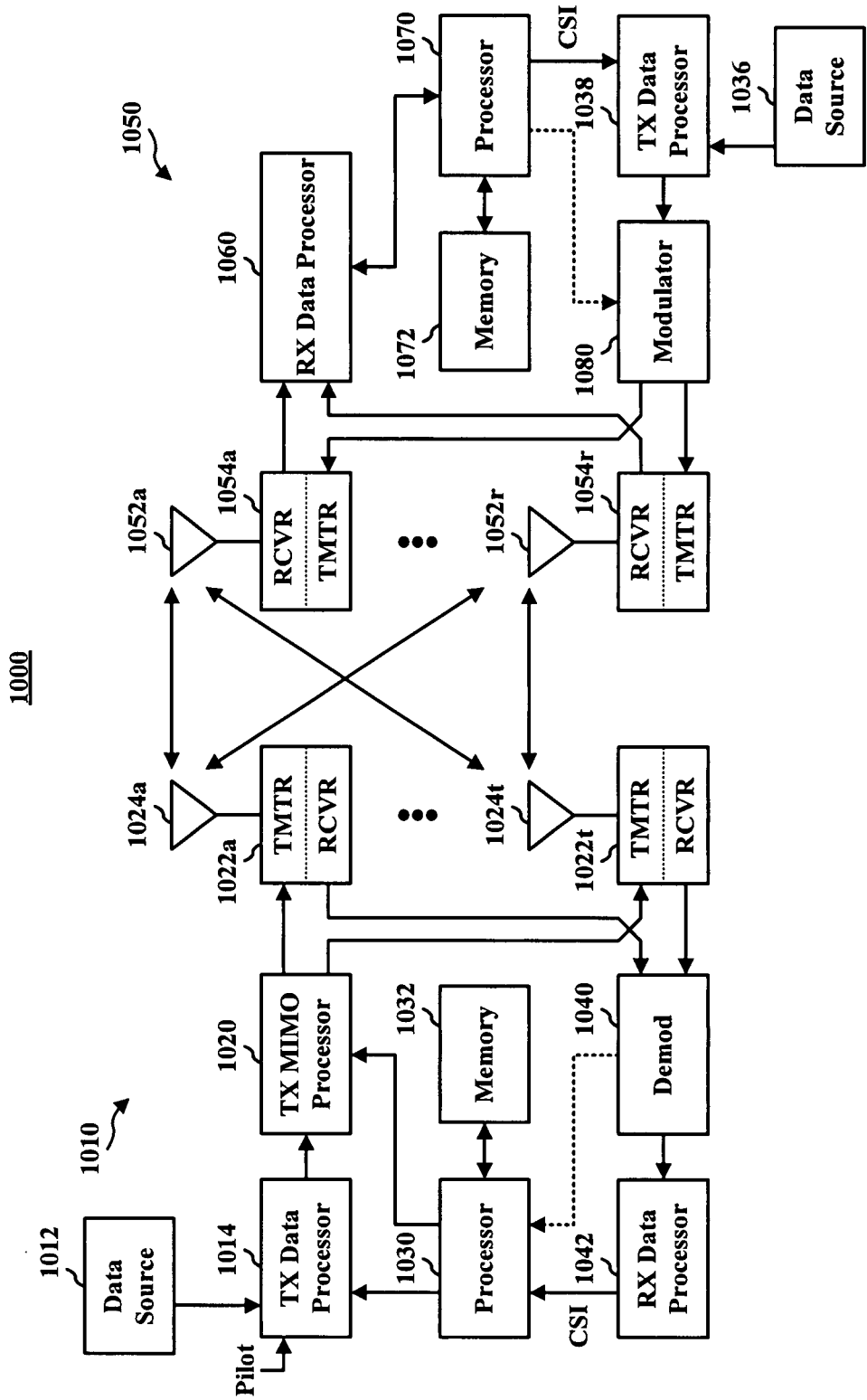
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-3 and 8-9), techniques/configurations (FIGS. 4-5) and/or methods (FIGS. 6-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which precoding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
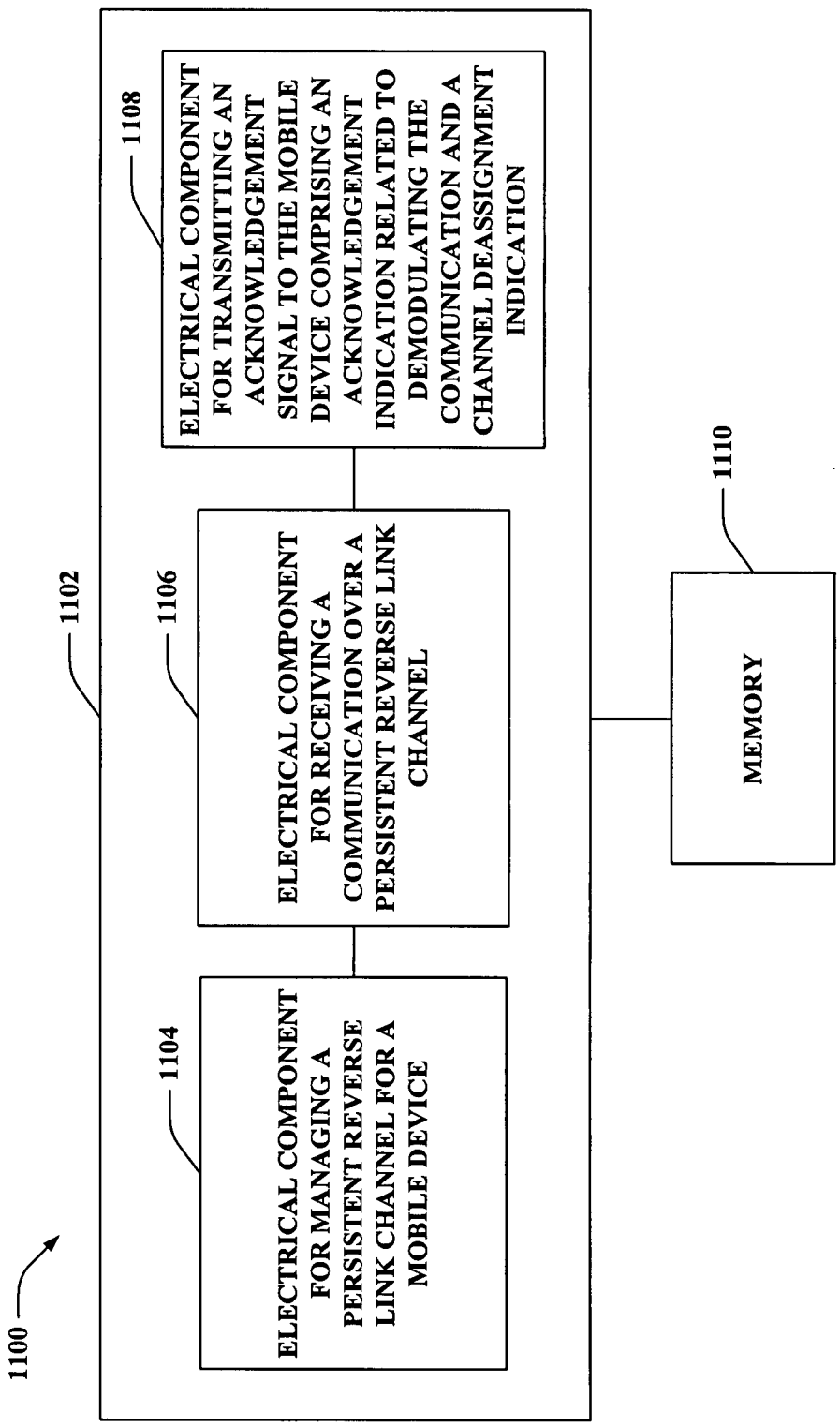
FIG. 11 is an illustration of an example system that transmits acknowledgement signals and manages persistent channels.

With reference to FIG. 11, a system 1100 that transmits acknowledgement signals over persistent reverse link channels is illustrated. For example, system 1100 can reside at least partially within a base station. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for managing a persistent reverse link channel for a mobile device 1104. For example, as described a mobile device can request access to a persistent reverse link channel for communicating information with an access point or base station. The persistent channel can last longer than just one data packet or data block transmission, for example. Further, logical grouping 1102 can comprise an electrical component for receiving a communication over a persistent reverse link channel 1106. For example, once the reverse link channel is established, the mobile device can modulate and transmit communication over the channel. Moreover, logical grouping 1102 can include an electrical component for transmitting an acknowledgement signal to the mobile device comprising an acknowledgement indication related to demodulating the communication and a channel deassignment indication 1108. As mentioned previously, the communication can be demodulated successfully or not successfully (for example, where the communication is an incomplete portion of a data packet). Accordingly, the acknowledgement indication can relate to the demodulation attempt. Moreover, the system 1100 can desire to deassign the reverse link channel for a variety of reasons as mentioned above, such as request from the device, device moving out of range, etc. Thus, the acknowledgement signal can include this information to save overhead of persistent channel management. Additionally, system 1100 can include a memory 1110 that retains instructions for executing functions associated with electrical components 1104, 1106, and 1108. While shown as being external to memory 1110, it is to be understood that one or more of electrical components 1104, 1106, and 1108 can exist within memory 1110.

Figure 12:
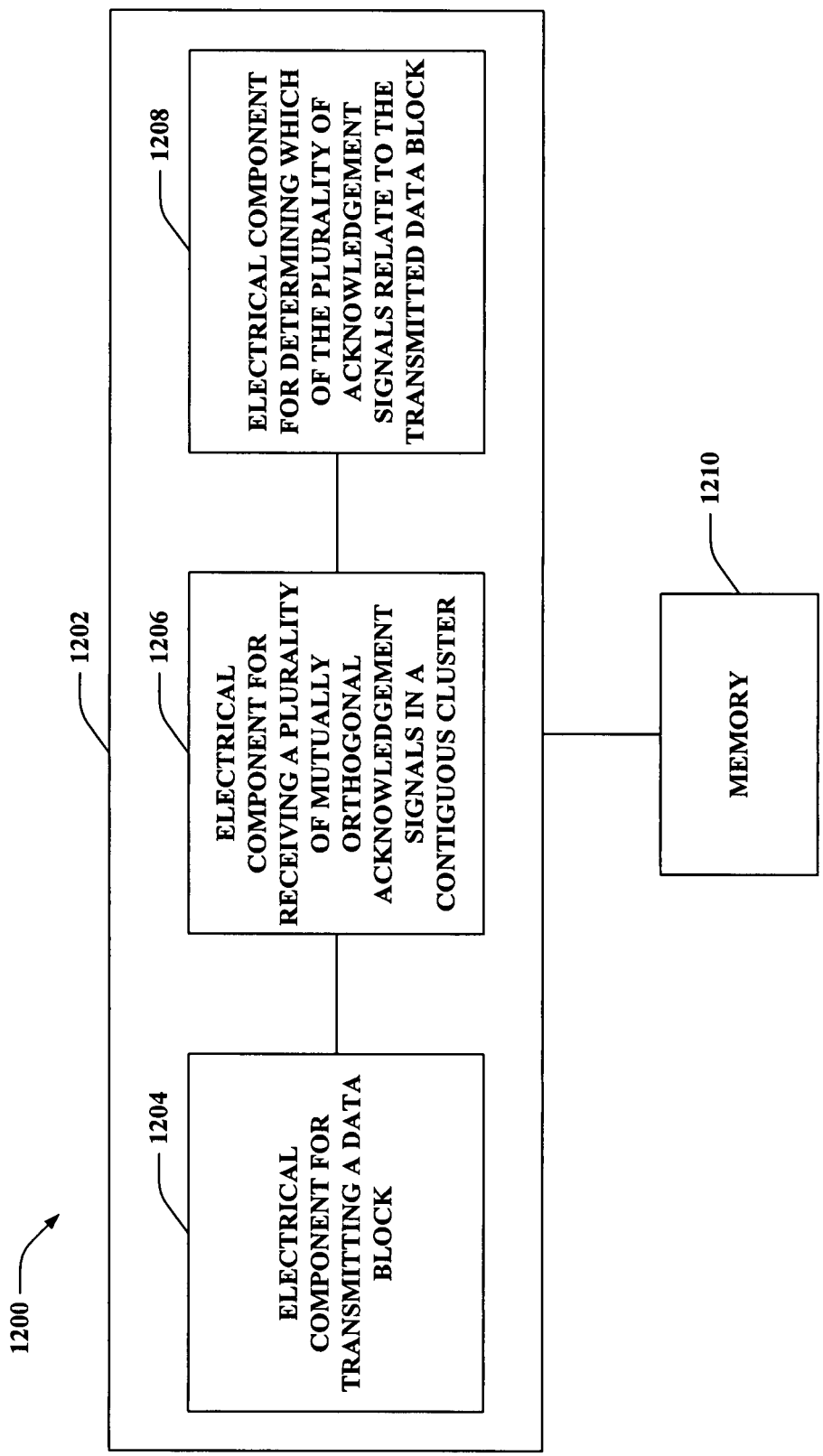
FIG. 12 is an illustration of an example system that receives an acknowledgement signal with a channel deassignment indicator.

Turning to FIG. 12, a system 1200 is displayed that facilitates receiving a plurality of contiguous acknowledgement signals. System 1200 can reside at least partially within a mobile device, for instance. As depicted, system 1200 includes functional blocks that can represent functions implemented by a processor, software, or combination thereof (e.g., firmware). System 1200 includes a logical grouping 1202 of electrical components that facilitate controlling reverse link transmission. Logical grouping 1202 can include an electrical component for transmitting a data block 1204. As described, this can be an entire data packet or a portion thereof, in the case of a portion, one or more remaining portions can be transmitted in subsequent communication frames, for example. Moreover, logical grouping 1202 can include an electrical component for receiving a plurality of mutually orthogonal acknowledgement signals in a contiguous cluster 1206. As mentioned, grouping the signals in clusters can provide multiple benefits including interference resistance for individual channels in the cluster, for example. Further, logical grouping 1202 can comprise an electrical component for determining which of the plurality of acknowledgement signals relate to the transmitted data block 1208. This can be done by way of an averaging algorithm, such as MMSE as mentioned above. Furthermore, system 1200 can include a memory 1210 that retains instructions for executing functions associated with electrical components 1204, 1206, and 1208. While shown as being external to memory 1210, it is to be understood that electrical components 1204, 1206, and 1208 can exist within memory 1210.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A wireless communications apparatus, comprising:
an acknowledgment signal definer configured to create an acknowledgement signal related to a reverse link communication; and
a modulator configured to spread the acknowledgment signal across a plurality of clusters respectively provided in a plurality of tiles, wherein each said tile is defined by a predetermined set of frequencies and a predetermined set of consecutive time periods and includes all frequency/time period combinations of said frequencies and said time periods, wherein each said cluster is a subset of said frequency/time period combinations, wherein each said frequency/time period combination of each said cluster has one of a same frequency and a same time period as another said frequency/time period combination of said cluster, and wherein said spreading of the acknowledgement signal is confined to the clusters.

2. The wireless communications apparatus of claim 1, the spreading of the acknowledgement signal is related to a mobile device identifier to which the reverse link corresponds.

3. The wireless communications apparatus of claim 2, the spreading of the acknowledgement signal is further related to an identifier of the wireless communications apparatus.

4. The wireless communications apparatus of claim 1, the acknowledgement signal is mutually orthogonal with one or more acknowledgement signals in the clusters.

5. The wireless communications apparatus of claim 4, the modulator is further configured to spread over a plurality of frequency regions using a discrete Fourier transform.

6. The wireless communications apparatus of claim 1, the acknowledgment signal comprises a boolean indication of a successful data block demodulation and a boolean indication of a channel deassignment.

7. The wireless communications apparatus of claim 6, the reverse link channel is deassigned according to the Boolean indication of the channel deassignment.

8. The wireless communications apparatus of claim 1, the acknowledgement signal is provided by phase shift keying (PSK) having three states and an off state corresponding to substantially all combinations of acknowledgement/no_acknowledgement and channel deassignment/no_deassignment.

9. A method that facilitates interpreting forward link acknowledgement signals, comprising:
transmitting a reverse link communication;
receiving a plurality of acknowledgement signals, wherein each of the acknowledgement signals is spread across a plurality of clusters respectively provided in a plurality of received time/frequency blocks, wherein each said time/frequency block is defined by a predetermined set of frequencies and a predetermined set of consecutive time periods and includes all frequency/time period combinations of said frequencies and said time periods, wherein each said cluster is a subset of said frequency/time period combinations, wherein each said frequency/time period combination of each said cluster has one of a same frequency and a same time period as another said frequency/time period combination of said cluster, wherein at least one of the acknowledgement signals indicates a demodulation status for the reverse link communication, and wherein the at least one acknowledgement signal is confined to the clusters; and determining the at least one acknowledgement signal that indicates the demodulation status for the reverse link communication.

10. The method of claim 9, further comprising transmitting a subsequent communication based on the demodulation status.

11. The method of claim 9, further comprising requesting establishment of a persistent reverse link channel on which the reverse link communication is transmitted.

12. The method of claim 9, the determined acknowledgement signal further indicates a channel deassignment indicator.

13. The method of claim 12, further comprising requesting a new reverse link channel based at least in part on the channel deassignment indicator.

14. The method of claim 9, the acknowledgement signal that indicates the demodulation status for the reverse link communication is determined by using a minimum mean squared error (MMSE) to decode the acknowledgement signals.

15. The method of claim 9, further comprising verifying the acknowledgement signal based at least in part on the clusters to mitigate acknowledgement error.

16. The method of claim 9, the acknowledgement signal is provided by phase shift keying (PSK) having three states and an off state corresponding to substantially all combinations of acknowledgement/no_acknowledgement and channel deassignment/no_deassignment.

17. A wireless communications apparatus that facilitates receiving and interpreting forward link acknowledgement signals, comprising:
    means for transmitting a data block;
    means for receiving a plurality of mutually orthogonal acknowledgement signals, wherein each of the acknowledgement signals is spread across a plurality of clusters respectively provided in a plurality of received time/frequency blocks, wherein each said time/frequency block is defined by a predetermined set of frequencies and a predetermined set of consecutive time periods and includes all frequency/time period combinations of said frequencies and said time periods, wherein each said cluster is a subset of said frequency/time period combinations, wherein each said frequency/time period combination of each said cluster has one of a same frequency and a same time period as another said frequency/time period combination of said cluster, and wherein the acknowledgement signals are confined to the clusters; and
    means for determining which of the plurality of acknowledgement signals relate to the transmitted data block.

18. The wireless communications apparatus of claim 17, further comprising means for transmitting a subsequent data block based on the determined acknowledgement signal.

19. The wireless communications apparatus of claim 17, further comprising means for requesting establishment of a persistent reverse link channel on which the data block is transmitted.

20. The wireless communications apparatus of claim 17, the determined acknowledgement signal further indicates a channel deassignment indicator.

21. The wireless communications apparatus of claim 20, further comprising means for requesting a new reverse link channel based at least in part on the channel deassignment indicator.

22. The wireless communications apparatus of claim 17, the determined acknowledgement signal is provided by phase shift keying (PSK) having three states and an off state corresponding to substantially all combinations of acknowledgement/no_acknowledgement and channel deassignment/no_deassignment.

23. A computer program product, comprising:
    a non-transitory computer-readable medium comprising:
        code for causing at least one computer to transmit a reverse link communication;
        code for causing the at least one computer to receive a plurality of acknowledgement signals, wherein each of the acknowledgement signals is spread across a plurality of clusters respectively provided in a plurality of received time/frequency blocks, wherein each said time/frequency block is defined by a predetermined set of frequencies and a predetermined set of consecutive time periods and includes all frequency/time period combinations of said frequencies and said time periods, wherein each said cluster is a subset of said frequency/time period combinations, wherein each said frequency/time period combination of each said cluster has one of a same frequency and a same time period as another said frequency/time period combination of said cluster, wherein at least one of the acknowledgement signals indicates a demodulation status for the reverse link communication, and wherein the at least one acknowledgement signal is confined to the clusters; and
        code for causing the at least one computer to determine the at least one acknowledgement signal that indicates the demodulation status for the reverse link communication.

24. The computer program product of claim 23, the non-transitory computer-readable medium further comprising code for causing at least one computer to request establishment of a persistent reverse link channel on which the reverse link communication is transmitted.

25. A wireless communication apparatus, comprising:
    a transmitter configured to transmit a reverse link communication;
    a receiver configured to receive a plurality of acknowledgement signals, wherein each of the acknowledgement signals is spread across a plurality of clusters respectively provided in a plurality of received time/frequency blocks, wherein each said time/frequency block is defined by a predetermined set of frequencies and a predetermined set of consecutive time periods and includes all frequency/time period combinations of said frequencies and said time periods, wherein each said cluster is a subset of said frequency/time period combinations, wherein each said frequency/time period combination of each said cluster has one of a same frequency and a same time period as another said frequency/time period combination of said cluster, wherein at least one of the acknowledgement signals indicates a demodulation status for the reverse link communication, and wherein the at least one acknowledgement signal is confined to the clusters; and
    a demodulator configured to determine the at least one acknowledgement signal that indicates the demodulation status for the reverse link communication.

* * * * *